US009193276B2

(12) United States Patent
Abe

(10) Patent No.: US 9,193,276 B2
(45) Date of Patent: Nov. 24, 2015

(54) POWER STORAGE DEVICE, POWER STORAGE METHOD, AND PROGRAM

(75) Inventor: Yuuichi Abe, Tokyo (JP)

(73) Assignee: Sony Corporation, Tokyo (JP)

( * ) Notice: Subject to any disclaimer, the term of this patent is extended or adjusted under 35 U.S.C. 154(b) by 440 days.

(21) Appl. No.: 13/424,997

(22) Filed: Mar. 20, 2012

(65) Prior Publication Data

US 2012/0249088 A1  Oct. 4, 2012

(30) Foreign Application Priority Data

Mar. 30, 2011 (JP) ................................ 2011-075766

(51) Int. Cl.
*H02J 7/06* (2006.01)
*H02J 7/24* (2006.01)
*B60L 11/18* (2006.01)

(52) U.S. Cl.
CPC .......... *B60L 11/1844* (2013.01); *B60L 2200/26* (2013.01); *B60L 2260/58* (2013.01); *Y02E 60/721* (2013.01); *Y02T 10/7005* (2013.01); *Y02T 90/121* (2013.01); *Y02T 90/128* (2013.01); *Y02T 90/14* (2013.01); *Y02T 90/163* (2013.01); *Y04S 10/126* (2013.01)

(58) Field of Classification Search
CPC ....... H02J 7/0073; H02J 7/0031; H02J 7/008; H02J 7/0072; H02J 7/0068; H02J 7/022; H02J 7/007; Y02E 60/12; H01M 10/44; Y02T 10/7005; Y02T 10/7088; G01R 31/3606
USPC ....................................................... 320/164
See application file for complete search history.

(56) References Cited

U.S. PATENT DOCUMENTS

| 8,963,504 B2 | 2/2015 | Kuroda et al. | |
| 2009/0062967 A1* | 3/2009 | Kressner et al. | 700/286 |
| 2010/0217485 A1* | 8/2010 | Ichishi | 701/36 |
| 2012/0249065 A1* | 10/2012 | Bissonette et al. | 320/109 |

FOREIGN PATENT DOCUMENTS

| JP | 03-060847 | 6/1991 |
| JP | 2001-008376 | 1/2001 |
| JP | 2002-315204 | 10/2002 |
| JP | 2004-094607 | 3/2004 |
| JP | 2004-318629 | 11/2004 |
| JP | 2005-160256 | 6/2005 |
| JP | 2006-211800 | 8/2006 |
| JP | 2009-022061 | 1/2009 |
| JP | 2009-136109 | 6/2009 |
| JP | 2010-041883 | 2/2010 |
| WO | 2011/018959 | 2/2011 |

OTHER PUBLICATIONS

Notification of the First Office Action issued in connection with Chinese Patent Application No. 2012100808438, dated Feb. 4, 2015. (18 pages).
Notification of Reason for Refusal issued in connection with Japanese Patent Application No. 2011-075766, dated Dec. 24, 2014. (10 pages).
Notification of Reason(s) for Refusal issued in connection with Japanese Patent Application No. 2011-075766, dated Jul. 28, 2015. (12 pp.).

* cited by examiner

*Primary Examiner* — Arun Williams
(74) *Attorney, Agent, or Firm* — K&L Gates LLP

(57) ABSTRACT

A power storage device including: a secondary battery; an acquisition unit that acquires charging period information for charging the secondary battery; and a charge control unit that calculates a charging power on the basis of the charging period information and controls charging power used for charging the secondary battery so that of the charging power is equal to the calculated charging power.

12 Claims, 12 Drawing Sheets

FIG. 4

| | 22 WED. | 23 THUR. | 24 FRI. | 25 SAT. | 26 SUN. | 27 MON. |
|---|---|---|---|---|---|---|
| CALENDAR | | NATIONAL HOLIDAY | | HOLIDAY | | |
| USER'S SCHEDULE | 8:00 ↔ 20:00 AT WORK | 11:00 ↔ 22:00 IN SHINJUKU | 8:00 ↔ 20:00 AT WORK | 7:00 ↔ ON A TRIP | ↔ 18:00 | 8:00 ↔ 20:00 AT WORK |
| PERIOD AVAILABLE FOR CHARGING | 20:00 | 34 HOURS | 20:00 8:00 | 7:00 9 HOURS | 18:00 | 8:00 14 HOURS |

FIG. 6

| WED., FEB. 2, 20XX | 8:00 – 8:30 |
| THUR., FEB. 2, 20XX | 19:30 – 20:00 |
| THUR., FEB. 3, 20XX | 8:00 – 8:30 |
| THUR., FEB. 3, 20XX | 19:30 – 20:00 |
| FRI., FEB. 4, 20XX | 8:00 – 8:30 |
| FRI., FEB. 4, 20XX | 19:30 – 20:00 |
| MON., FEB. 7, 20XX | 8:00 – 8:30 |
| MON., FEB. 7, 20XX | 19:30 – 20:00 |
| ... | |

POWER STORAGE DEVICE, POWER STORAGE METHOD, AND PROGRAM

CROSS REFERENCES TO RELATED APPLICATIONS

The present application claims priority to Japanese Priority Patent Application JP 2011-075766 filed in the Japan Patent Office on Mar. 30, 2011, the entire content of which is hereby incorporated by reference.

BACKGROUND

The present disclosure relates to power storage devices, power storage methods, and programs.

In recent years, secondary batteries that can be used many times after being repeatedly recharged have been widely used as power sources for mobile terminal devices such as cellular phones and laptop computers. On the other hand, electric power generation from renewable energy sources, that is, natural energy sources such as sunlight, wind power, and geothermal heat have been attracting attention from the viewpoint of global environmental conservation and $CO_2$ emission reduction. It is not easy to supply stable electric power using these natural energy sources because the amount of energy obtainable from these natural energy sources constantly varies depending on natural conditions such as the amount of sunlight and the force of wind. Therefore, some effort has been made to supply stable electric power by outputting uniform electric power with the use of a combination of secondary batteries and natural energy sources.

In addition to the above-mentioned usage, a secondary battery is expected to be widely used in various other applications. However, there is a problem in that a secondary battery deteriorates after repeated charge-discharge operations, with the result that the voltage and electric energy of the secondary battery decrease.

A power storage system that prevents a secondary battery from being charged with an excessively high charging current and increases the life of the secondary battery is disclosed, for example, in Japanese Unexamined Patent Application Publication No. 2010-41883. To put it concretely, according to the power storage system described in Japanese Unexamined Patent Application Publication No. 2010-41883, a period during which an amount of charge electric energy in the power storage system increases is determined, as a restrictive period during which a charging current value has to be limited, on the basis of remaining amount of electric energy of a battery, consumption patterns of power consumed by loads, and power generation prediction patterns, and the charging current value during the restrictive period is calculated. Therefore, the battery is prevented from being charged with an excessively high charging current and the life of the battery can be prolonged.

In addition, a method in which an optimization plan that optimizes a charged state of a secondary battery on the basis of a user's schedule is disclosed in Japanese Unexamined Patent Application Publication No. 2004-94607. To put it concretely, a method in which the deterioration of a secondary battery owing to continuous charging of the secondary battery can be suppressed is disclosed in Japanese Unexamined Patent Application Publication No. 2004-94607. The suppression of the deterioration is achieved by keeping the secondary battery in a full-charge state only at the time near to a period during which the secondary battery is supposed to be continuously used for a long time, and by keeping the secondary battery in a charged state that is lower than the full-charge state during a period in which the secondary battery and an external power source are used in parallel for a long time.

SUMMARY

In the disclosure according to Japanese Unexamined Patent Application Publication No. 2010-41883, a charging current value is calculated on the basis of the load and a predicted power generation amount, and a period necessary for a stored electric energy level in the power storage system to reach to a predetermined target electric energy level is determined. Generally speaking, one of the cases of degradation of a secondary battery is a charging current having a large value. In other words, the more rapidly the secondary battery is charged up, the more the secondary battery deteriorates. However, in Japanese Unexamined Patent Application Publication No. 2010-41883, the deterioration of a secondary battery is not taken into consideration when the value of the charging current is determined.

In Japanese Unexamined Patent Application Publication No. 2004-94607, although putting a secondary battery in a full-charge state, which is one of reasons for the degradation of the secondary battery, can be avoided by determining an optimization plan for a charged state of the secondary battery on the basis of a user's schedule is disclosed, a comparatively high charging ratio (for example, 80%) relative to the full-charge electric energy of the secondary battery is kept even in the case where the user does not use the secondary battery for a long time, which leads to a considerable deterioration of the secondary battery.

On the other hand, there is a certain charging system in which, if a user sets a machine to a battery charger, charging of a secondary battery starts instantly. In addition, every time when remaining amount of electric energy of the secondary battery decreases owing to self-discharge after the completion of the charging, recharging of the secondary battery starts to compensate the loss of the remaining amount of electric energy, which leads to the fact that a comparatively high charging ratio of the secondary battery is typically kept. However, from the viewpoint of a user, it will be all right if the recharging of the secondary battery is completed at the time when the user starts using the machine, that is, the secondary battery, therefore keeping a high charging ratio, and repeated self-discharge and recharge of the secondary battery will wastefully lead to the deterioration of the secondary battery.

With the above-described problems in mind, embodiments of the present disclosure are intended to provide newly-developed and improved power storage devices and power storage methods that are capable of controlling charging of a secondary battery so that the suppression of the deterioration of the secondary battery and the prolongation of the life of the secondary battery are realized, and a program used for the above power storage devices and the power storage methods.

An embodiment of the present disclosure provides a power storage device that includes a secondary battery; an acquisition unit that acquires charging period information for charging the secondary battery; and a charge control unit that calculates a charging power value on the basis of the charging period information and controls charging power used for charging the secondary battery so that the value of the charging power is equal to the calculated charging power value.

In addition, the embodiment of the present disclosure provides a power storage method that includes the procedures of: acquiring charging period information for charging a secondary battery; calculating a charging power value on the basis of the charging period information; and controlling charging power used for charging the secondary battery so that the value of the charging power is equal to the calculated charging power value.

In addition, the embodiment of the present disclosure provides a program that causes a computer to execute the processes of: acquiring charging period information for charging a secondary battery; calculating a charging power value on the basis of the charging period information; and controlling charging power used for charging the secondary battery so that the value of the charging power is equal to the calculated charging power value.

As described above, the embodiment of the present disclosure can perform charge control that is capable of controlling charging of a secondary battery so that the suppression of the deterioration of the secondary battery and the prolongation of the life of the secondary battery are realized.

Additional features and advantages are described herein, and will be apparent from the following Detailed Description and the figures.

BRIEF DESCRIPTION OF THE FIGURES

FIG. 4 is a diagram showing an example of a user's schedule according to the first embodiment of the present disclosure;

FIG. 6 is a diagram showing an example of a usage history according to the second embodiment of the present disclosure;

DETAILED DESCRIPTION

Figure 1:
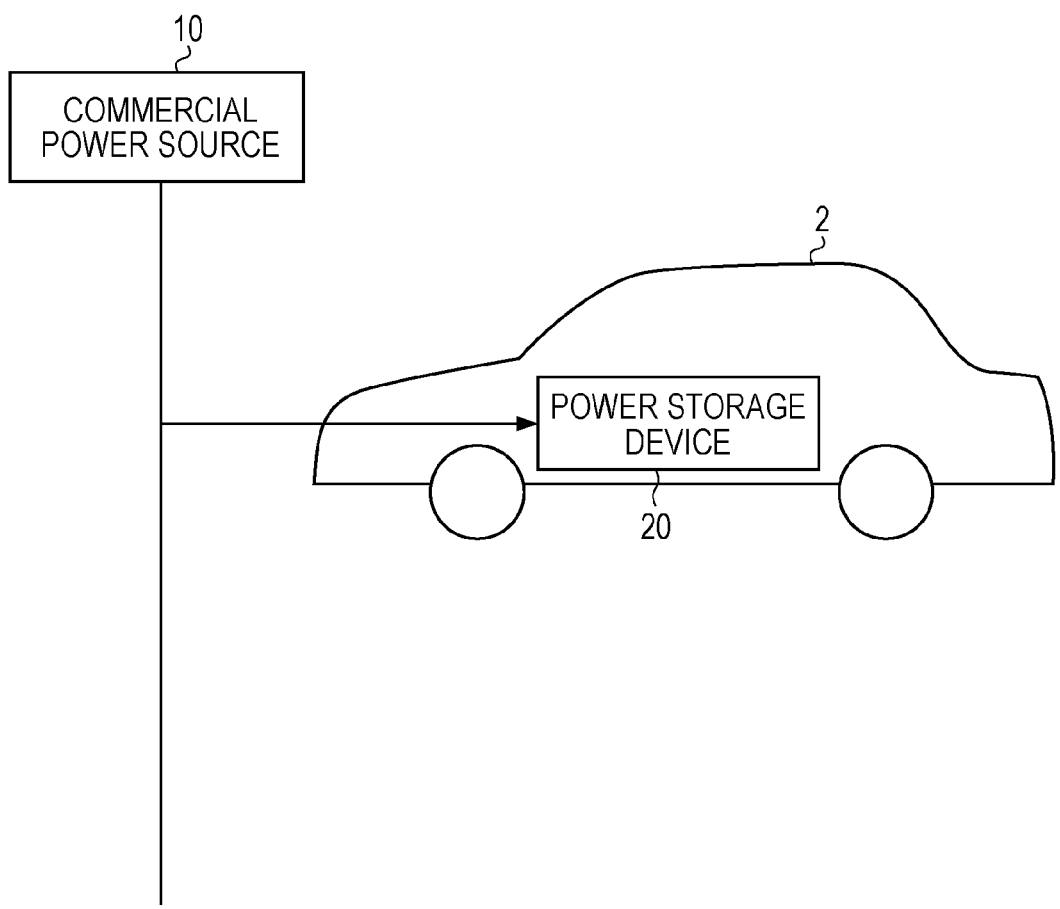
FIG. 1 is an overall view showing a power storage system according to an embodiment of the present disclosure.

Preferred embodiments of the present disclosure will be described in detail with reference to the accompanying drawings hereinafter. In this specification and the accompanying drawings, components that have effectively the same functional configuration are indicated by the same reference numerals and repeated description is avoided.

Descriptions about the embodiments will be made regarding the following subjects in the following order.
1. OVERVIEW OF POWER STORAGE SYSTEM
2. DESCRIPTION ABOUT EACH EMBODIMENT
    2-1. FIRST EMBODIMENT
    2-2. SECOND EMBODIMENT
    2-3. THIRD EMBODIMENT
    2-4. FOURTH EMBODIMENT
3. CONCLUSION <1. Overview of Power Storage System>

As described in detail later, the present disclosure can be realized in various forms of embodiments such as "2-1. FIRST EMBODIMENT" to "2-4. FOURTH EMBODIMENT". In addition, each of the power storage devices in the above embodiments to be respectively described later includes:

a) a secondary battery 210;

b) an acquisition unit, a charging period calculation unit 230, a charging period input unit 270, or a communication unit 280 that acquires charging period information for charging the secondary battery;

c) a charge control unit 250 that calculates a charging power value on the basis of the charging period information and controls charging power used for charging the secondary battery so that the value of the charging power is equal to the calculated charging power value.

First, a fundamental configuration common in the above four embodiments will be described with reference to FIG. 1 below.

FIG. 1 is an overall view showing a power storage system according to an embodiment of the present disclosure. As shown in FIG. 1, the power storage system according to the embodiment of the present disclosure includes a commercial power source 10 and a power storage device 20 mounted on an electric car 2. The power storage device 20 is charged by being supplied electric power from the commercial power source 10, and supplies electric power stored in itself to each device of the electric car 2. This power storage device 20 is designed in such a manner that, when a charging period is determined, it charges the relevant secondary battery with a charging current the value of which is necessarily and sufficiently large enough to fully charge the secondary battery in the charging period. Therefore, the power storage device 20 according to the embodiment of the present disclosure is capable of avoiding unnecessarily rapid charging, with the result that the suppression of the deterioration of the secondary battery and the prolongation of the life of the secondary battery are realized.

Although FIG. 1 shows the power storage device 20 that is mounted on the electric car 2 and supplies electric power to each device mounted on the electric car 2 as an example, a physical object on which the power storage device 20 is mounted on is not limited to an electric car and target objects to which the power storage device 20 supplies electric power are not limited to devices such as those mounted on an electric car. For example, the power storage device 20 can be mounted on various vehicles such as an electric car, an electric train, and an airplane, or can be mounted on mobile terminal devices such as a portable PC (personal computer) and a cellular phone. In addition, it is conceivable that the power storage device 20 is used for supplying electric power to household electric appliances such as a household display apparatus and a household air-conditioning apparatus other than the above-mentioned vehicles and machines.

The overview of the power storage system has been described above with reference to FIG. 1. The first embodiment to the fourth embodiment of the present disclosure will be described in detail in this order hereinafter.

<2. Description about each Embodiment>

[2-1. First Embodiment]

(Block Configuration of Power Sotrage Device 20-1)

Figure 2:
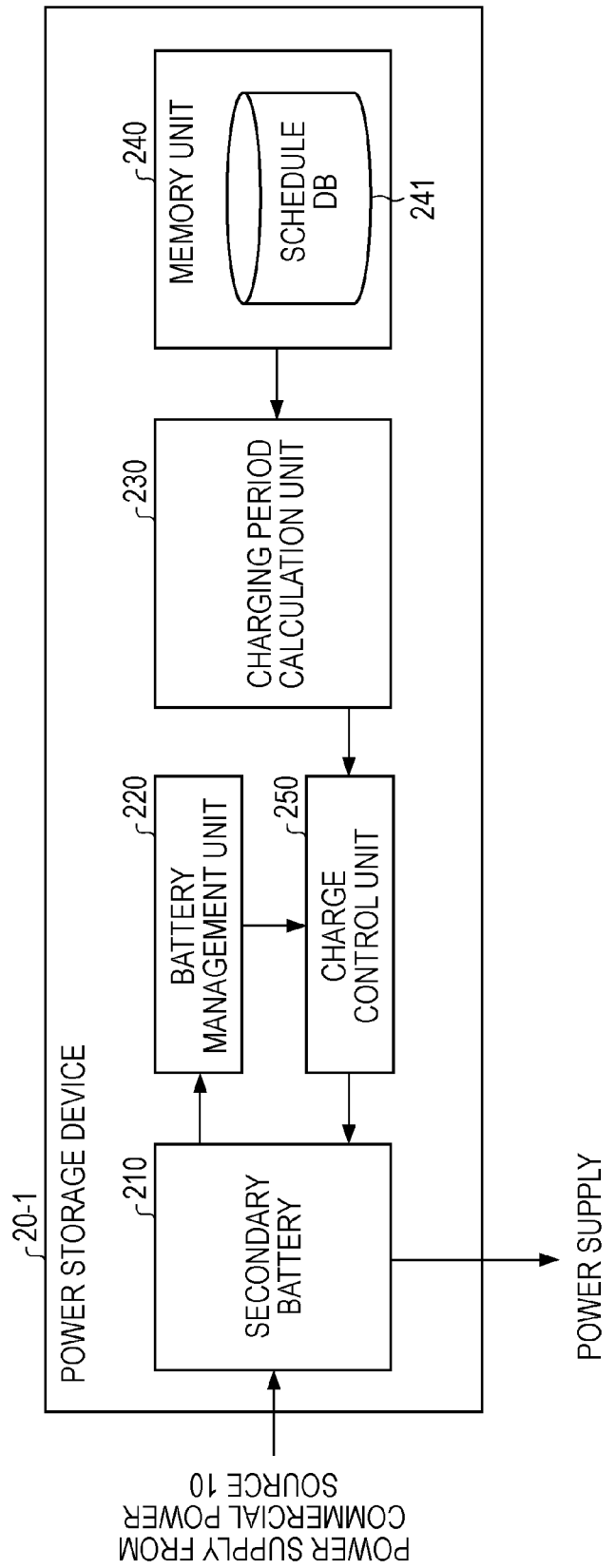
FIG. 2 is a block configuration diagram of a power storage device according to a first embodiment of the present disclosure.

FIG. 2 is a functional block diagram of a power storage device 20-1 according to a first embodiment of the present disclosure. As shown in FIG. 2, the power storage device 20-1 according to the first embodiment includes a secondary battery 210, a battery management unit 220, a charging period calculation unit 230, a memory unit 240, and a charge control unit 250. Each unit will be described below.

The secondary battery 210 is a battery that can be used many times after being repeatedly charged. Electric power stored in the secondary battery 210 is converted from direct-current power to alternating-current power when necessary, and the converted power is supplied to a physical object on which the power storage 20-1 is mounted, for example, to an electric car 2.

The battery management unit 220 is a detection unit that detects remaining amount of electric energy of the secondary battery 210 by monitoring the secondary battery 210. For example, the battery management unit 220 can calculate the remaining amount of electric energy of the secondary battery 210 by measuring the difference between the current battery voltage of the secondary battery 210 and the battery voltage when the secondary battery 210 is full-charge because the battery voltage is apt to decrease in accordance with the amount of electric energy consumed in the secondary battery 210. Alternatively, it is conceivable that the battery management unit 220 calculates the remaining amount of electric energy of the secondary battery 210 in consideration of the difference between input power input to the secondary battery 210 and output power output from the secondary battery 210 acquired by measuring the input power and output power. The battery management unit 220 sends information concerning the detected remaining amount of electric energy to the charge control unit 250.

The charging period calculation unit 230 acquires schedule information from a schedule DB (database) 241 stored in the memory unit 240, and calculates a charging period on the basis of the acquired schedule information. The schedule information is schedule information concerning the usage of the electric car 2 on which the power storage device 20-1 is mounted. The charging period calculation unit 230 calculates the charging period within a time zone in which the electric car 2 is supposed not to be used on the basis of the acquired schedule information.

The memory unit 240 stores the schedule DB 241 in which a user records his/her schedule. In this embodiment of the present disclosure, a schedule concerning the usage of the electric car 2 is recorded in the schedule DB 241 as an example of a schedule. A schedule is recorded in the schedule DB 241 using an input interface (not shown) such as a keyboard or a mouse. Alternatively, the user can record schedule information, which is stored in a PC (personal computer) or a mobile terminal device, in the schedule DB 241 by synchronizing the schedule DB 241 with the schedule information.

The charge control unit 250 calculates a charging power value on the basis of the charging period calculated by the charging period calculation unit 230 and the remaining amount of electric energy of the secondary battery 210 detected by the battery management unit 220, and controls charging power used for charging the secondary battery 210 so that the value of the charging power is equal to the calculated charging power value. To put it concretely, the charge control unit 250 can calculate, as the charging power value, a power value to provide a necessary amount of electric energy within the charging period calculated by the charging period calculation unit 230. Here, the necessary amount of electric energy can be a difference between the full-charge electric energy of the secondary battery 210 and the remaining amount of electric energy of the secondary battery 210 detected by the battery management unit 220, or can be a difference between an electric energy that is a predetermined fraction of the full-charge electric energy of the secondary battery 210 and the remaining amount of electric energy of the secondary battery 210 detected by the battery management unit 220.

In this embodiment of the present disclosure, although description has been made and will be made under the assumption that a charging power value is calculated on the basis of the charging period calculated by the charging period calculation unit 230 and the remaining amount of electric energy of the secondary battery 210 detected by the battery management unit 220, the technological scope of the present disclosure should not limited by this assumption. For example, the charge control unit 250 can calculate a charging power value on the basis of a charging period calculated by the charging period calculation unit 230 without using the remaining amount of electric energy of the secondary battery 210.

As a concrete example, the charge control unit 250 can regard the full-charge electric energy of the secondary battery 210 as electric energy necessary to charge the secondary battery 210 regardless of the remaining electric energy of the secondary battery 210. With the use of the above configuration of the power storage device 20-1, even if the remaining amount of electric energy of the secondary battery 210 is zero, the secondary battery 210 can be full-charge up within the charging period calculated by the charging period calculation unit 230.

Alternatively, if the amount of electric energy that will be consumed the next time the electric car 2 is used can be estimated, for example, from schedule information, because the amount of charged electric energy of the secondary battery has to be at least equal to the amount of electric energy that will be consumed the next time the electric car 2 is used, the charge control unit 250 can set this amount of to-be-consumed electric energy to be the amount of electric energy necessary to charge the secondary battery 210. Alternatively, if the average amount of consumed electric energy or the maximum amount of consumed electric energy per usage of the electric car 2 can be acquired, the charge control unit 250 can set the average amount of consumed electric energy or the maximum amount of consumed electric energy to be the amount of electric energy necessary to charge the secondary battery 210.

(Operation Processes of Power Storage Device 20-1)

Hitherto, the configuration of the power storage device 20-1 according to the first embodiment has been described with reference to FIG. 2. Next, the operation processes of the power storage device 20-1 according to the first embodiment will be described with reference to FIG. 3.

Figure 3:
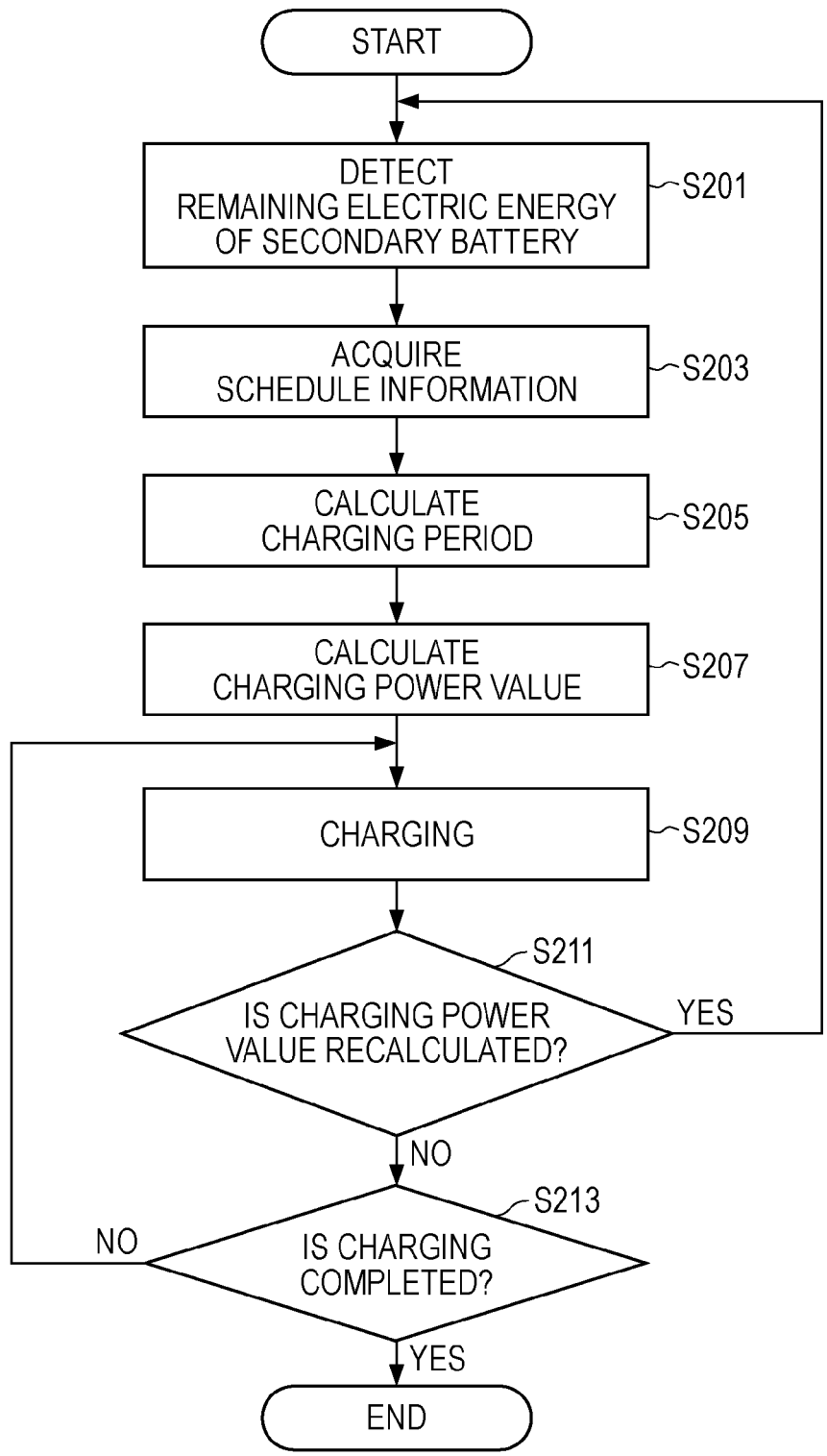
FIG. 3 is a flowchart showing processes of a power storage method according to the first embodiment of the present disclosure.

FIG. 3 is a flowchart showing processes of a power storage method according to the first embodiment of the present disclosure. As shown in FIG. 3, first, the battery management unit 220 detects the remaining amount of electric energy of the secondary battery 210, and sends information concerning the remaining amount of electric energy to the charge control unit 250 at step S201.

Next, at step S203, the charging period calculation unit 230 acquires schedule information, which was recorded in advance by a user, from the memory unit 240. Next, at step S205, the charging period calculation unit 230 calculates a charging period on the basis of the acquired schedule information. Here, the relationship between schedule information and a charging period will be described with reference to FIG. 4.

FIG. 4 is an explanatory diagram showing an example of a user's schedule according to the first embodiment of the present disclosure. As shown in FIG. 4, the user who has this schedule goes to work at about 8 a.m. and comes home at about 8 p.m. weekdays. This user intends to go on a trip using his/her electric car on the 25th (Saturday) and 26th (Sunday), and his/her schedule time of departure is 7 a.m. on the 25th and his/her schedule time of return is 6 p.m. on the 26th. On the 23rd (Thursday), he/she intends to go to Shinjuku, but will not use his/her electric car (this schedule is indicated by a dashed line). Such a schedule as this is recorded in the schedule DB 241 in advance by the user as a piece of information used for setting a period that can be used for charging a secondary battery because his/her electric car will not be used during the period.

To put it concretely, looking at the schedule shown in FIG. 4, it can be supposed that the period of 34 hours from 8 p.m. on the 22nd (Wednesday) to 8 a.m. on the 24th (Friday) is a period that can be used for charging the power storage device 20-1. Therefore, the charging period calculation unit 230 can determine a charging period for charging the secondary battery 210 within the 34-hour period that is supposed to be available for charging. In a similar way, it can be supposed that the 9-hour period from 8 p.m. on the 24th (Friday) to 7 a.m. on the 25th (Saturday), and the 14-hour period from 6 p.m. on the 26th (Sunday) to 8 a.m. on the 27th (Monday) are periods that can be used for charging the power storage device 20-1. Therefore, the charging period calculation unit 230 can determine the charging period for charging the power storage device 20-1 within the above period of 9 hours or 14 hours.

The above description concerning the schedule shown in FIG. 4 has been made under the assumption that the power storage device 20-1 is charged at the user's home, and it is supposed that a time period during which the electric car 2 on which the power storage device 20-1 is mounted is at home is a period that can be used for charging the power storage device 20-1. On the other hand, if it is assumed that a period during which the electric car 2 is in the user's workplace is a period available for charging, a part of a time period scheduled for the user's work can be set to be a period that can be used for charging the power storage device 20-1.

In addition, it is conceivable that the charging period calculation unit 230 calculates a charging period using not only schedule information concerning one user but also schedule information concerning plural users. For example, in recent years, a car-sharing service in which plural members share a car has become widely used. In this service, it is necessary that a member notifies the other members of his/her time period for using the car in advance in order for the members to effectively use the car. Therefore, it is conceivable that the charging period calculation unit 230 calculates a charging period used for charging the shared car on the basis of information concerning plural members' time periods for using the car.

The description of the operation processes of the power storage device 20-1 will be continued below with reference to the flowchart of FIG. 3. The charge control unit 250 calculates a charging power value at step S207 on the basis of the charging period calculated at step S205.

A concrete example of a charging power value calculation that the charge control unit 250 performs will be shown below. Let us denote a necessary amount of electric energy for charging that is a difference between an amount of target charge electric energy and remaining amount of electric energy of the secondary battery 210 by C (kWh), a charging period by t (h), and a charging voltage by V (V). In this case, the minimum charging current necessary to give the necessary amount of electric energy to the secondary battery is represented by C×1000/t/V (A). For example, if the necessary amount of electric energy C for charging the secondary battery from its empty state to its fully charged state is 21 kWh, the charging period is 14 h, and the charging voltage is 100 V, the charging current acquired by calculation is 21×1000/14/100=15 (A). In the above example, if the charging period is 7 (h), the charging current is doubled, that is, it becomes 30 (A). As described above, charging with the use of a time period supposed to be available for the charging makes it possible to keep the charging current low, with the result that the deterioration of the secondary battery can be suppressed.

Next, at step S209, the charge control unit 250 charges the secondary battery 210 with the charging power value calculated at step S205.

In addition, the charge control unit 250 can repeatedly determine whether the charging power value is to be recalculated or not at step S211. This function of the charge control unit 250 is prepared for the reason that there is a possibility that information concerning the remaining amount of electric energy of the secondary battery 210 detected at step S201 and the charging power value calculated at step 207 is not theoretically accurate. Generally speaking, because the characteristics of the secondary battery are influenced by the type of battery, the degree of deterioration, temperature, usage, and the like, it is difficult to perform accurate calculation of the remaining amount of electric energy of the battery and scheduled charge control. Therefore, repeated recalculation of the charging power value is performed in order to complete the charging within a charging period. Step S211 can be performed at predetermined time intervals. If the recalculation is performed, the flow goes back to step S201, and if the recalculation is not performed, the flow proceeds to step S213.

Next, at step S213, the charge control unit 250 judges whether charging the secondary battery 210 is completed or not. If charging is completed, the power storage process shown in FIG. 3 ends. If charging is not completed, the flow goes back to step S209, and the charging is continued.

The above-described power storage process can be started by a trigger showing that the secondary battery has entered a chargeable state. For example, when a power storage device 20-1 is mounted on an electric car 2, the power storage device 20-1 detects that a charging plug is connected to the electric car 2, and can start the power storage process upon being triggered by this detection. To put it concretely, as shown by the schedule in FIG. 4, in the case where the user comes home at 8 p.m. on the 22nd (Wednesday), and connects a charging plug to an electric car, 34 hours from 8 p.m. on the 22nd (Wednesday) to 8 a.m. on the 24th (Friday) that is his/her schedule time of using the electric car is set to be a period that can be used for charging.

In addition, the target electric energy information used for calculating the charging power value by the charge control unit 250 at step S207 is not limited to information concerning the full-charge electric energy. For example, after a time period during which the electric car 2 is used is calculated on the basis of information concerning the user's schedule, an amount of target electric energy can be determined in accordance with the time period. If the time period during which the electric car 2 is used is short, the amount of target electric energy can be 80% of the full-charge electric energy. In this case, the judgment that charging is completed is made when remaining amount of electric energy becomes 80% of the full-charge electric energy.

In the above-described concrete example of the charging power value calculation, although the charging voltage is set to be 100 V, and the charging power is suppressed to a low level by changing the charging current in accordance with the charging period, the power storage process according to the embodiments of the present disclosure is not limited to this example, and it is conceivable that the charging voltage value is made selectable (i.e., the charging method is made selectable).

For example, it will be assumed that the electric car 2 is designed so that it can be charged with a single phase-voltage 100 V power source, a single-phase voltage 200 V power source, and a three-phase voltage 200 V power source (for rapid charging). In this case, there is a relationship between a power source and a charging period, and a charging period corresponding to a single phase-voltage 100 V power source is longer than a charging period corresponding to a single-phase voltage 200 V power source, and the charging period corresponding to a single phase-voltage 200 V power source is longer than a charging period corresponding to a three-phase voltage 200 V power source (for rapid charging). On the other hand, a degree of deterioration of the secondary battery corresponding to a single phase-voltage 100 V power source is smaller than a degree of deterioration corresponding to a single-phase voltage 200 V power source, and the degree of deterioration corresponding to a single phase-voltage 200 V power source is smaller than a degree of deterioration corresponding to a three-phase voltage 200 V power source (for rapid charging). Therefore, in order to prolong the life of the battery, it is recommendable that a single phase-voltage 100 V power source is used for charging. As a result, it is desirable that the charge control unit 250 automatically selects a lowest possible voltage power source in accordance with the charging period calculated on the basis of information concerning the user's schedule, which makes it possible to prevent the deterioration of the battery without hampering the user's convenience.

[2-2. Second Embodiment]

Next, a power storage device 20-2 according to a second embodiment of the present disclosure will be described hereinafter. Although a charging period was calculated using information concerning a user's schedule in the above-described first embodiment, a charging period is calculated on the basis of a user's usage history in the second embodiment.

(Block Configuration of Power Storage Device 20-2)

Figure 5:
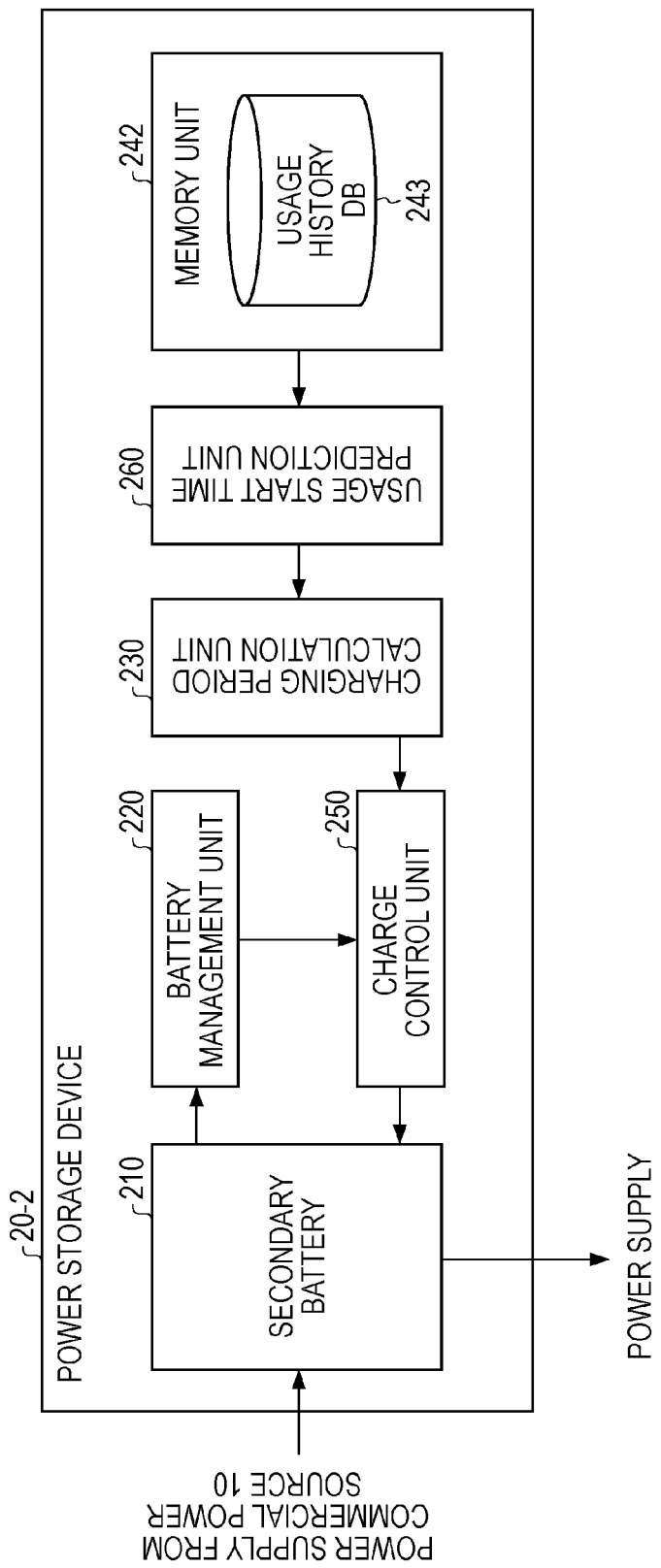
FIG. 5 is a block configuration diagram of a power storage device according to a second embodiment of the present disclosure.

First, the configuration of the power storage device 20-2 according to the second embodiment will be described with reference to FIG. 5. FIG. 5 is a block configuration diagram of the power storage device 20-2 according to the second embodiment of the present disclosure. As shown in FIG. 5, the power storage device 20-2 includes a secondary battery 210, a battery management unit 220, a charging period calculation unit 230, a memory unit 242, a usage start time prediction unit 260, and a charge control unit 250.

The memory unit 242 stores a usage history DB 243. The usage history DB 243 records usage history information of the power storage device 20-2. For example, as shown in FIG. 6, usage history information concerning an electric car 2 on which the power storage device 20-2 is mounted is automatically recorded in the usage history DB 243.

The usage start time prediction unit 260 acquires user's usage history information from the memory unit 242, and predicts a time when the user starts using the electric car 2 on the basis of the user's usage history information. In addition, the usage start time prediction unit 260 sends the information concerning the predicted usage start time to the charging period calculation unit 230.

The charging period calculation unit 230 calculates a time period from the charging start time to the usage start time predicted by the usage start time prediction unit 260 or a part of the time period from the charging start time to the usage start time predicted by the usage start time prediction unit 260 as a charging period. In a similar way as described in the first embodiment, the charge control unit 250 controls charging power used for charging the secondary battery 210 on the basis of the charging period calculated by the charging period calculation unit 230 and remaining amount of electric energy of the secondary battery 210 detected by the battery management unit 220. Here, because the detailed description about the content of the charge control has already been made in the first embodiment, they will be omitted.

As is the case for the first embodiment, the above-described second embodiment can suppress the deterioration of a secondary battery and prolong the life of the secondary battery. In addition to the above advantages, the second embodiment can save a user's trouble of having to explicitly input information concerning his/her schedule into the schedule DB 241.

(Operation Processes of Power Storage Device 20-2)

Hitherto, the configuration of the power storage device 20-2 according to the second embodiment has been described with reference to FIG. 5. Next, the operation processes of the power storage device 20-2 according to the second embodiment will be described with reference to FIG. 7.

Figure 7:
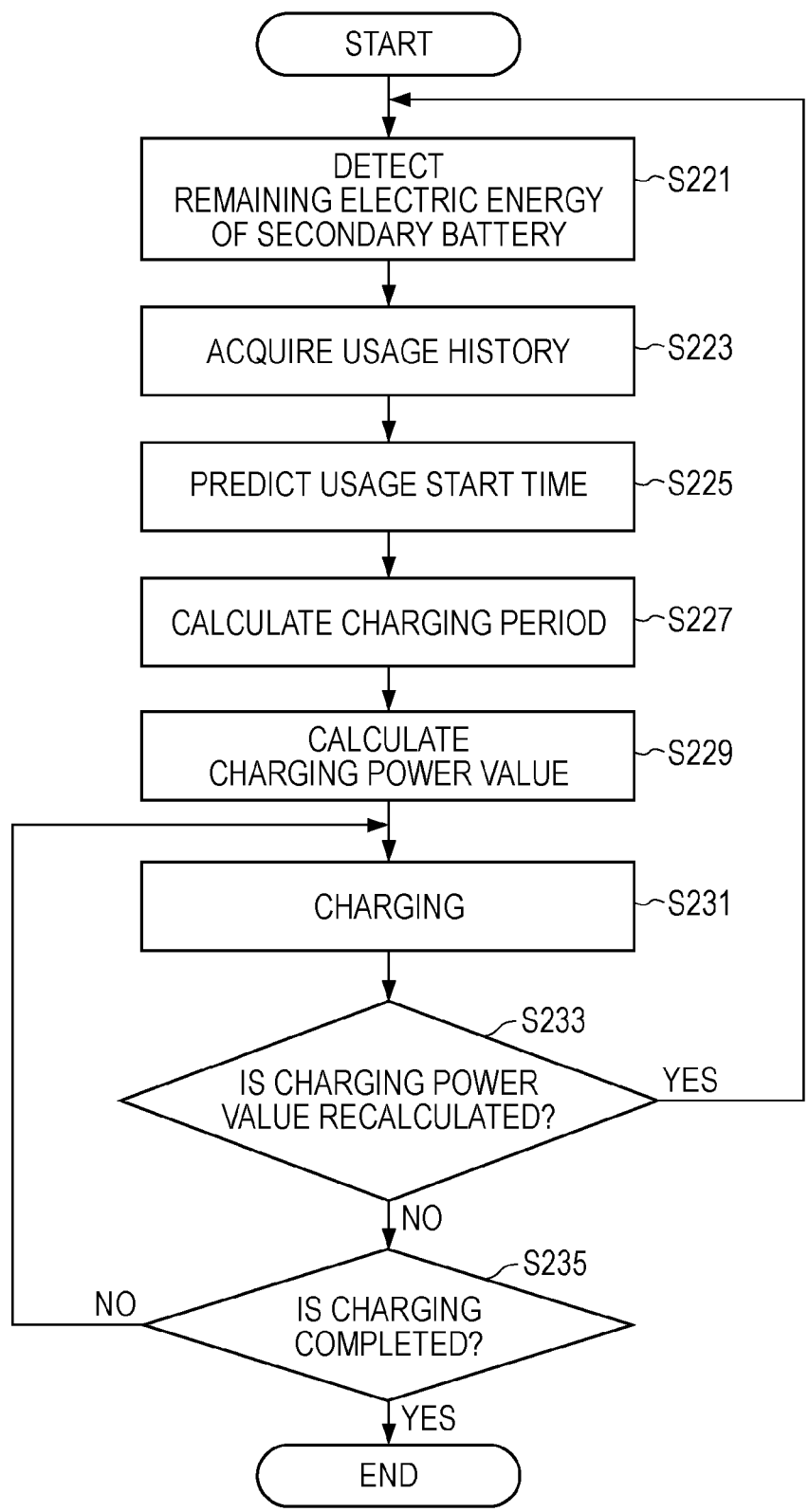
FIG. 7 is a flowchart showing processes of a power storage method according to the second embodiment of the present disclosure.

As shown in FIG. 7, first, the battery management unit 220 detects remaining amount of electric energy of the secondary battery 210, and sends information concerning the remaining amount of electric energy to the charge control unit 250 at step S221.

Next, at step S223, the usage start time prediction unit 260 acquires usage history information from the memory unit 242. The usage start time prediction unit 260 subsequently predicts a usage start time on the basis of the acquired usage history information at step S225.

Next, at step S227, the charging period calculation unit 230 calculates a charging period on the basis of the usage start time predicted at step S225. The charging period can be a period from the charging start time to the usage start time, or a part of the period from the charging start time to the usage start time.

As described above, in this embodiment, with the use of the automatically recorded usage history of a machine on which the power storage device is mounted instead of schedule information a user has to explicitly input, the charging period can be calculated without troubling the user.

For example, the usage history information of FIG. 6 shows a set usage pattern that the electric car 2 is used for a time period from 8:00 to 8:30 and a time period from 19:30 to 20:00 on weekdays. Therefore, if the electric car 2 becomes ready to be charged at 20:00 on Thursday, it can be predicted by the usage start time prediction unit 260 that a user starts using the electric car 2 at 8:00 the next day judging from the above usage pattern. Therefore, the charging period calculation unit 230 can set a time period from 20:00 to 8:00 the next day as the charging period for the electric car 2.

Next, at step S229, the charge control unit 250 calculates a charging power value on the basis of the charging period calculated at step S227.

Subsequently, at step S231, the charge control unit 250 charges the secondary battery 210 with the charging power value calculated at step S229.

In addition, the charge control unit 250 can repeatedly judge whether the charging power value is recalculated or not at step S233. If the recalculation is performed, the flow goes back to step S221, and if the recalculation is not performed, the flow proceeds to step S235.

Next, at step S235, the charge control unit 250 judges whether charging the secondary battery 210 is completed or not. If charging is completed, the power storage process shown in FIG. 7 ends. If charging is not completed, the flow goes back to step S231, and charging is continued.

[2-3. Third Embodiment]

Next, a power storage device 20-3 according to a third embodiment of the present disclosure will be described hereinafter. Although a charging period was calculated using information concerning a user's schedule in the above-described first embodiment, the calculation of a charging period based on the information concerning the user's schedule is not necessary because a charging period directly input by the user is used in this third embodiment. Therefore, the power storage device 20-3 according to this embodiment can cope with an emergent demand for charging.

(Block Configuration of Power Storage Device 20-3)

Figure 8:
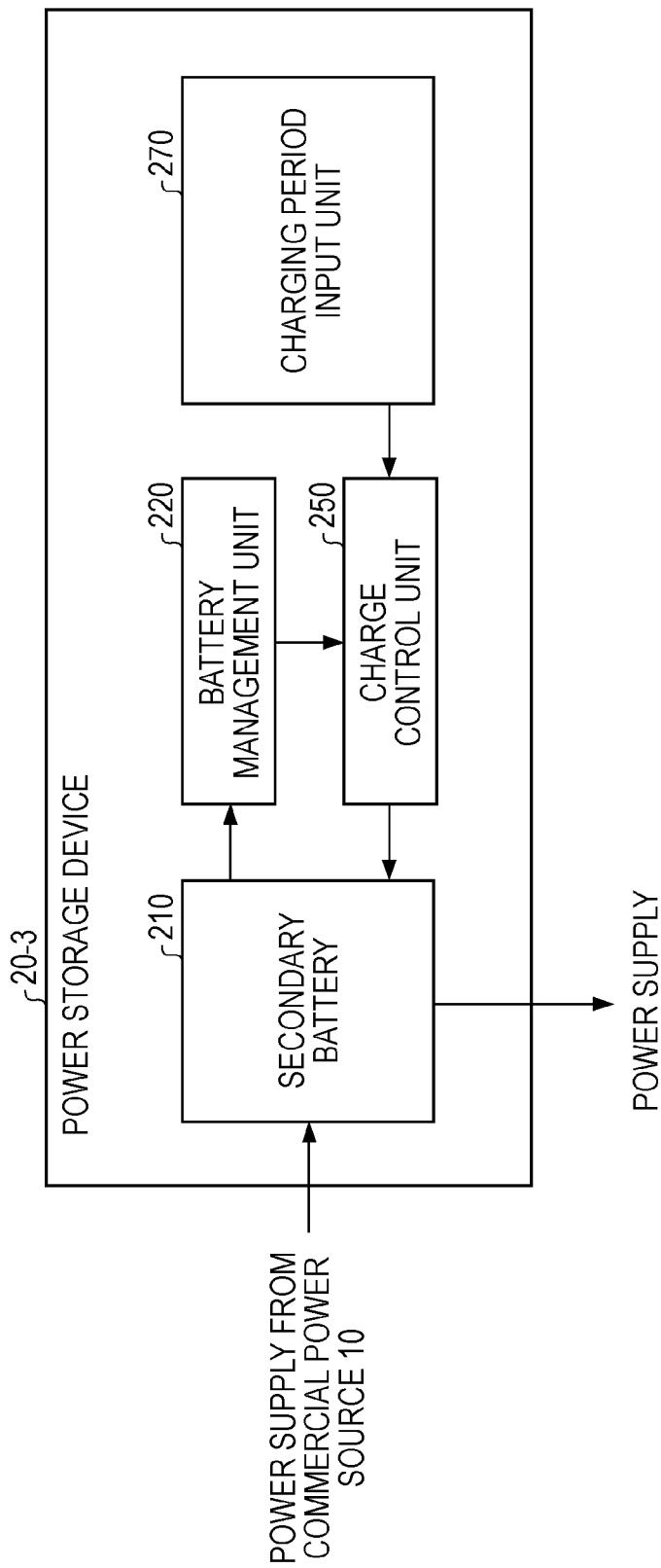
FIG. 8 is a block configuration diagram of a power storage device according to a third embodiment of the present disclosure.

First, the configuration of the power storage device 20-3 according to the third embodiment of the present disclosure will be described with reference to FIG. 8. As shown in FIG. 8, the power storage device 20-3 includes a secondary battery 210, a battery management unit 220, a charging period input unit 270, and a charge control unit 250.

The charging period input unit 270 acquires charging period information by receiving the charging period information input by a user. The charging period information received by the charging period input unit 270 is sent to the charge control unit 250.

As described in the first embodiment, the charge control unit 250 controls charging power used for charging the secondary battery 210 on the basis of the charging period sent from the charging period input unit 270 and remaining amount of electric energy of the secondary battery 210 detected by the battery management unit 220. Here, because the detailed descriptions about the content of the charge control have already been made in the first embodiment, they will be omitted.

Even in the case where sudden or emergent charging is necessary, since information concerning charging period information is explicitly input by a user, this third embodiment may prevent a secondary battery 210 from being charged with an unnecessarily rapid charging current.

(Operation Processes of Power Storage Device 20-3)

Next, the operation processes of the power storage device 20-3 according to the third embodiment will be described with reference to FIG. 9.

Figure 9:
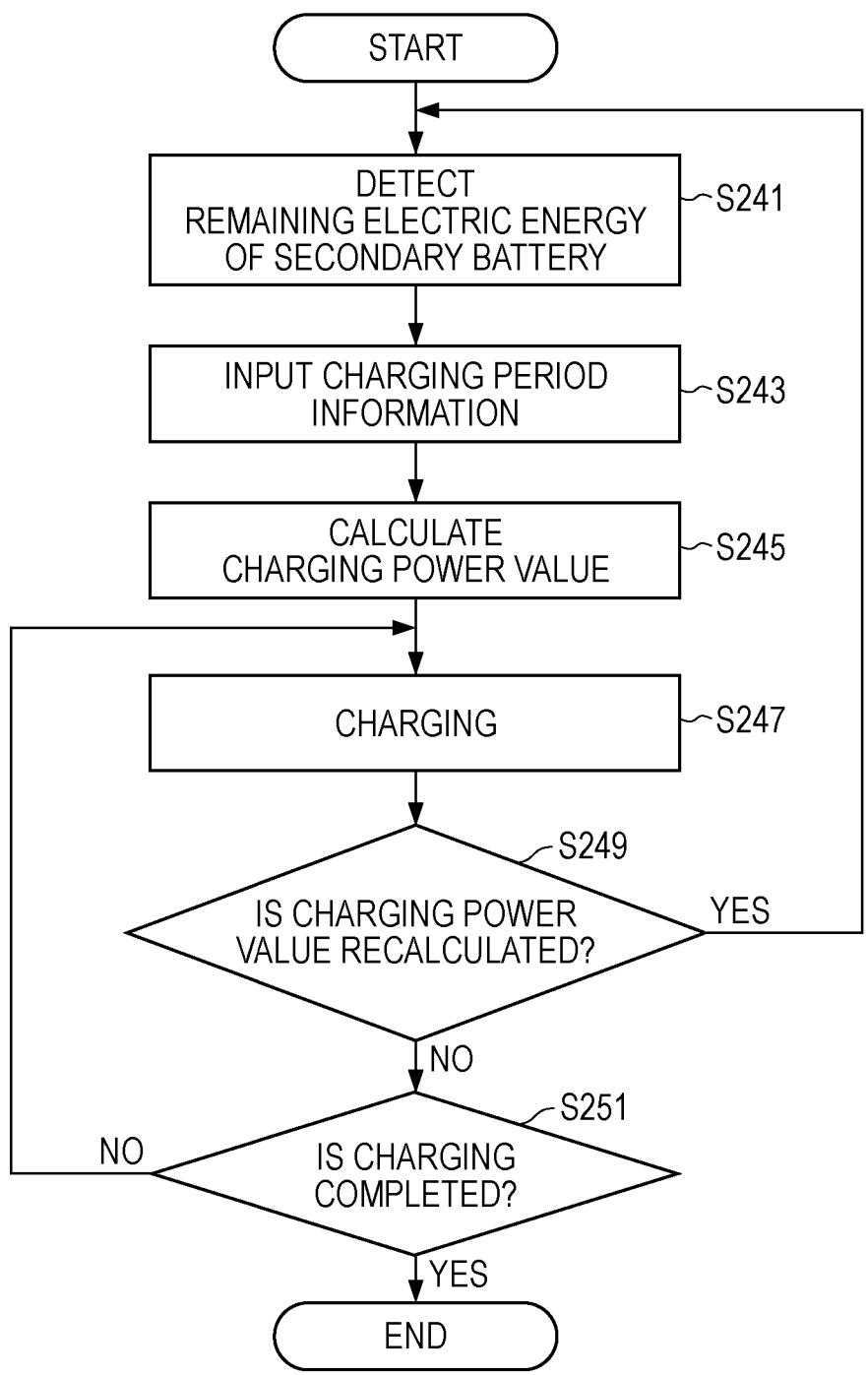
FIG. 9 is a flowchart showing processes of a power storage method according to the third embodiment of the present disclosure.

As shown in FIG. 9, first, the battery management unit 220 detects remaining amount of electric energy of the secondary battery 210, and sends information concerning the remaining amount of electric energy to the charge control unit 250 at step S241.

Next, at step S243, charging period information is input into the charging period input unit 270 by a user.

It is conceivable that an electric car is charged, for example, at a parking spot in a commercial architecture other than at home or at a battery charging station. In this case, while a user is utilizing the commercial architecture, the electric car 2 parked at the parking spot is charged, which is considerably convenient for the user. The user takes how long he/she stays in the commercial architecture into consideration when inputting charging period into the charging period input unit 270.

In this way, the secondary battery 2 can be charged with a charging power value in accordance with the length of the user's stay.

Next, at step S245, the charge control unit 250 calculates the charging power value on the basis of the charging period calculated at step S243.

Subsequently, at step 247, the charge control unit 250 subsequently charges the secondary battery 210 with the charging power value calculated at step 245.

In addition, the charge control unit 250 can repeatedly judge whether the charging power value is recalculated or not at step S249. If the recalculation is performed, the flow goes back to step S241, and if the recalculation is not performed, the flow proceeds to step S251.

Next, at step S251, the charge control unit 250 judges whether charging the secondary battery 210 is completed or not. If charging is completed, the power storage process shown in FIG. 9 ends. If charging is not completed, the flow goes back to step S247, and charging is continued.

[2-4. Fourth Embodiment]

Figure 10:
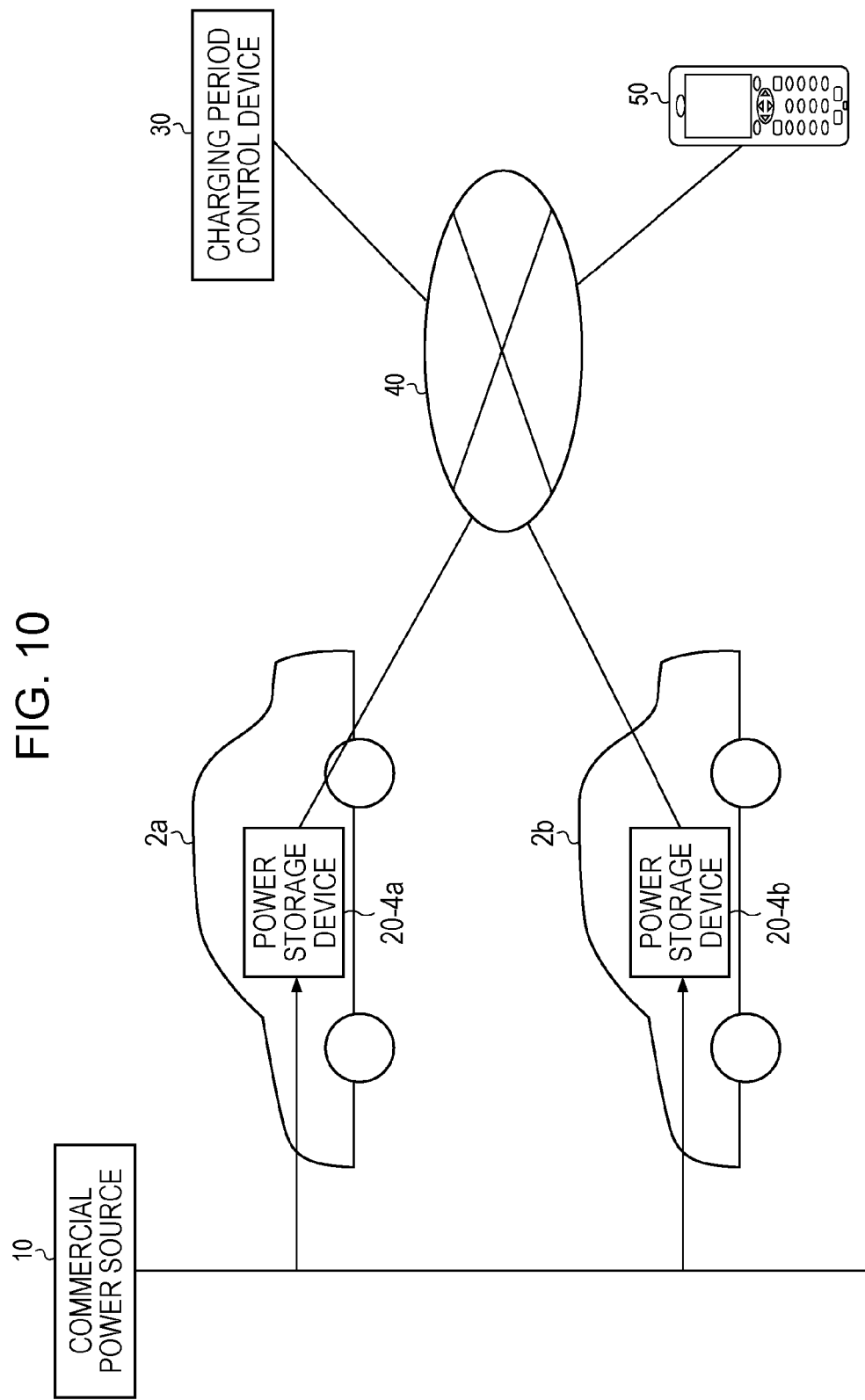
FIG. 10 is an overall view showing a power storage system according to a fourth embodiment of the present disclosure.

Next, a power storage device 20-4 according to a fourth embodiment of the present disclosure will be described hereinafter. First, a power storage system that uses this power storage device 20-4 will be described in reference to FIG. 10. As shown in FIG. 10, the power storage system according to this embodiment includes a power storage device 20-4*a* mounted on an electric car 2*a*, a power storage device 20-4*b* mounted on an electric car 2*b*, and a charging period control device 30, and a mobile terminal device 50, and a network 40 that connects the power storage devices 20-4*a*, 20-4*b*, the charging period control device 30, and the mobile terminal device 5 with each other.

(Block Configuration of Power Storage Device 20-4)

Figure 11:
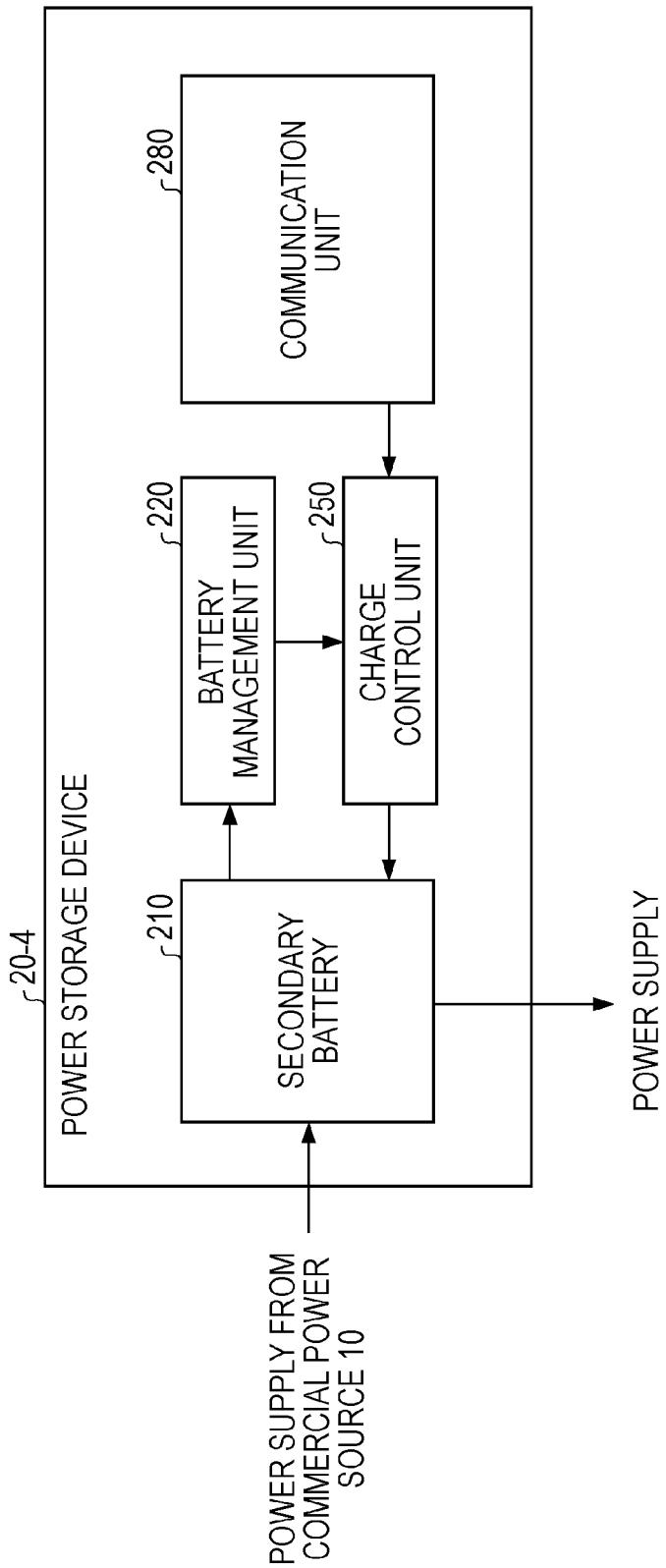
FIG. 11 is a block configuration diagram of a power storage device according to the fourth embodiment of the present disclosure.

Next, the configuration of the power storage device 20-4 according to the fourth embodiment of the present disclosure will be described with reference to FIG. 11. As shown in FIG. 11, the power storage device 20-4 includes a secondary battery 210, a battery management unit 220, a communication unit 280, and a charge control unit 250.

The communication unit 280 is connected to the charging period control device 30 via the network 40, and receives charging period information from the charging period control device 30. The communication unit 280 sends the received charging period information to the charge control unit 250. Here, it is conceivable that the communication unit 280 is connected to the network 40 via a wireless LAN (local area network) communication function, via a wireless communication function such as a 4G communication function, or via a wire communication function.

Because the descriptions about other components have already been made in the first embodiment, they will be omitted.

(Block Configuration of Charging Period Control Device 30)

Figure 12:
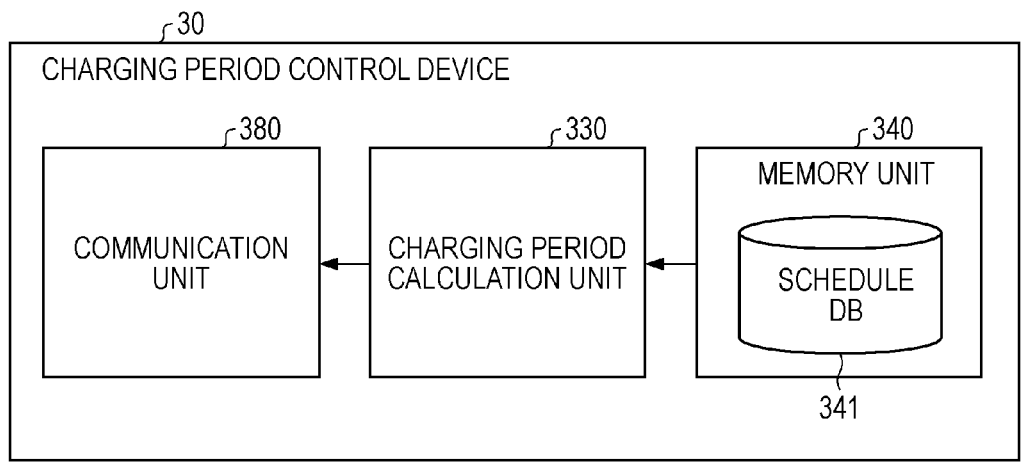
FIG. 12 is a block configuration diagram of a charging period control device according to the fourth embodiment of the present disclosure.

Next, the configuration of the charging period control device 30 according to the fourth embodiment of the present disclosure will be described with reference to FIG. 12. As shown in FIG. 12, the charging period control device 30 includes a charging period calculation unit 330, a memory unit 340, and a communication unit 380.

The charging period calculation unit 330 acquires schedule information from a schedule DB (database) 341 stored in the memory unit 240, and calculates a charging period on the basis of the acquired schedule information as is the case with the charging period calculation unit 230 described in the first embodiment. Subsequently, the charging period calculation unit 330 sends the calculated charging period information to the communication unit 380.

The memory unit 340 stores the schedule DB 341 in which a user recorded his/her schedule. The user can record schedule information, which is stored in a mobile terminal device 50, in the schedule DB 341 by synchronizing the schedule DB 341 with the schedule information.

The communication unit 380, which is connected to the power storage device 20-4 via the network 40, sends the charging period information to the power storage device 20-4. Alternatively, the communication unit 380 can acquire the schedule information from the mobile terminal device 50 because it is connected to the mobile terminal device 50 via the network 40.

(Operation Processes of Charge Control)

Hitherto, the configurations of the power storage device 20-4 and the charging period control device 30 have been described with reference to FIG. 11 and FIG. 12. Next, the operation processes of the power storage device 20-4 and the charging period control device 30 according to this embodiment will be described with reference to FIG. 13.

Figure 13:
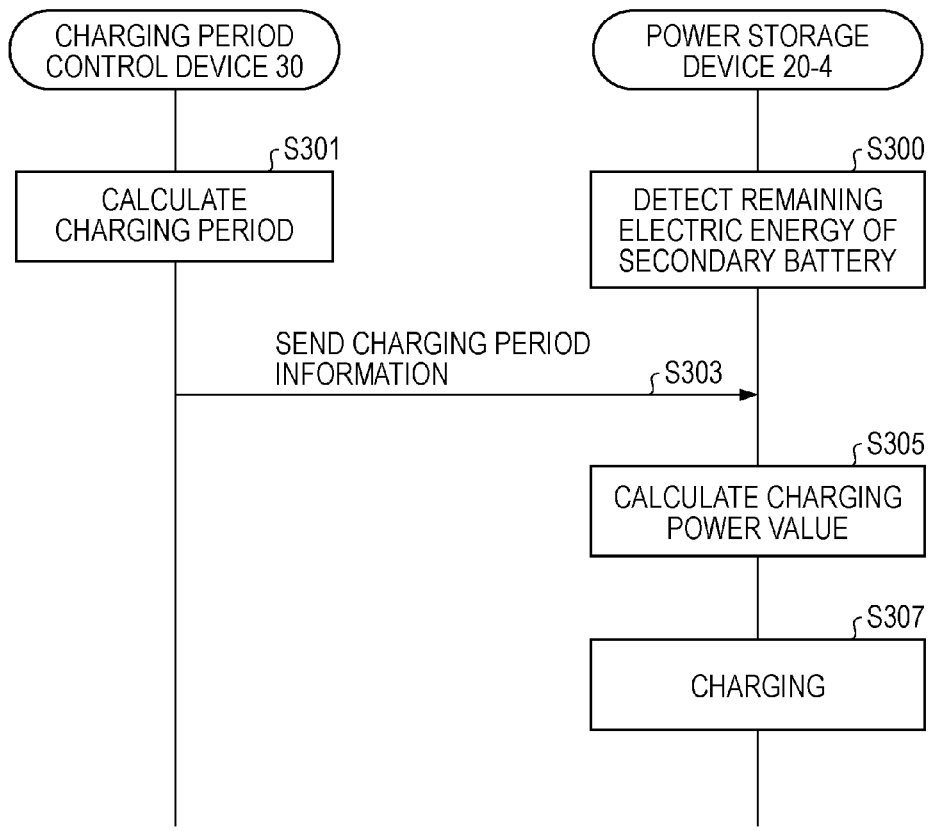
FIG. 13 is a time chart of a power storage method according the fourth embodiment of the present disclosure.

FIG. 13 is a time chart of a power storage method according the fourth embodiment of the present disclosure. As shown in FIG. 13, first, the battery management unit 220 of the power storage device 20-4 detects the remaining amount of electric energy of the secondary battery 210, and sends information concerning the remaining amount of electric energy to the charge control unit 250 at step S300.

On the other hand, at step S301, the charging period calculation unit 330 of the charging period control device 30 acquires schedule information from the memory unit 340, and calculates a charging period on the basis of the acquired schedule information.

Next, at step S303, the charging period control device 30 sends the charging period calculated at step S301 via the communication unit 380. Alternatively, the charging period control device 30 can sends the charging period information in response to a request from the power storage device 20-4.

Next, at step S305, the charge control unit 250 of the power storage device 20-4 calculates a charging power value on the basis of the charging period information sent from the charging period control device 30 at step S303.

Subsequently, at step S307, the charge control unit 250 charges the secondary battery 210 with the charging power value calculated at step S305.

In addition, after starting charging the secondary battery 210 at step S307, the processes shown in step S209 to step 213 in FIG. 3, which are some of the operation processes of the above-described first embodiment, can be performed although they are not shown in FIG. 13.

As described above, in this embodiment, schedule information used for calculating a charging period is managed through a network. As shown in the first embodiment, in the case of machines on each of which a power storage devices 20-1 that includes a charging period calculation unit 230 and a memory unit 240 storing a schedule DB 241 is mounted, it is necessary that usage schedules of machines have to be recorded on a usage schedule-by-a machine basis, which leads to a troublesome input operation. On the other hand, because the charging period control device 30, which can be connected to a network, includes the charging period calculation unit 330 and the memory unit 340 that stores the schedule DB 341, plural power storage devices can share schedules. Therefore, users have only to record usage schedules of plural power storage devices in the charging period control device 30 that collectively manages the usage schedules.

In addition, because the charging period control device 30 can be accessed with the use of a mobile terminal device 50, the remote operation of a power storage process can be performed. For example, a user who is out can control the charging period for an electric car 2 at home by changing the usage schedule of the electric car 2.

<3. Conclusion>

As described above, in each of the power storage systems according to the embodiments of the present disclosure, when a charging period is determined, a secondary battery is charged with a minimum necessary power value during the charging period so that the secondary battery has necessary amount of electric energy. As a result, the power storage device 20 according to the embodiments of the present disclosure can prevent the secondary battery from being charged with an unnecessarily rapid charging current, so that the suppression of the deterioration of the secondary battery and the prolongation of the life of the secondary battery are realized.

Hitherto, although the preferred embodiments of the present disclosure have been described, technologies concerning the present disclosure are not limited to those described in the above exemplary embodiments. It will be obvious that those skilled in the art of the present disclosure can easily conceive of various alterations and modifications of the embodiments of the present disclosure within the scope of the technical ideas described in the following claims, and it is to be understood that such alterations and modifications naturally fall within the technical scope of the present disclosure.

For example, a combination of the above-described embodiments can be used. To put it concretely, if schedule information is not enough to calculate a charging period, the relevant usage history can be used for calculating the charging period, or if the charging period is input by a user, this charging period can be directly used. Alternatively, by mounting a communication unit on the power storage device according to the first or third embodiments, recording a schedule or inputting a charging period can be done by the user with the use of a mobile terminal device.

The technologies concerning the embodiments of the present disclosure can also make the power storage device to be configured in the following ways.

(1) A power storage device including: a secondary battery; an acquisition unit that acquires charging period information for charging the secondary battery; and a charge control unit that calculates a charging power value on the basis of the charging period information and controls charging power used for charging the secondary battery so that the value of the charging power is equal to the calculated charging power value.

(2) The power storage device described in (1), further including a detection unit that detects remaining amount of electric energy of the secondary battery, in which the charge control unit calculates a charging power value on the basis of the difference between an amount of target charge electric energy and the remaining amount of electric energy of the secondary battery and the charging period information.

(3) The power storage device described in (2), in which the charge control unit calculates a charging power value necessary for making up the difference.

(4) The power storage device described in any of (1) to (3), further including a memory unit that stores user's schedule information, in which the acquisition unit calculates the charging period information on the basis of the schedule stored in the memory unit.

(5) The power storage device described in any of (1) to (4), further including: a memory unit that stores a usage history of the power storage device; and a prediction unit that predicts a usage start time when a user starts using the power storage device on the basis of the usage history stored by the memory unit, in which the acquisition unit calculates the charging period information on the basis of the usage start time predicted by the prediction unit.

(6) The power storage device described in any of (1) to (5), in which the acquisition unit acquires charging period information input by a user.

(7) The power storage device described in any of (1) to (6), in which the charge control unit selects a charging method on the basis of the charging period information and the charging power value.

(8) The power storage device described in any of (1) to (7), in which the acquisition unit receives charging period information that a charging period control device calculates on the basis of user's schedule information.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A power storage device comprising:
    a secondary battery;
    a charging period calculation unit that acquires charging period information for charging the secondary battery and receives the charging period information that is calculated by a charging period control device on the basis of a user's schedule information through wireless communication; and
    a charge control unit that calculates a charging power on the basis of the charging period information, controls charging power used for charging the secondary battery so that the charging power is equal to the calculated charging power, and repeatedly determines whether the charging power is to be recalculated.

2. The power storage device according to claim 1, further comprising
    a detection unit that detects a remaining amount of electric energy of the secondary battery,
    wherein the charge control unit calculates a charging power value on the basis of both a difference between an amount of a target charge electric energy and the remaining amount of electric energy of the secondary battery and the charging period information.

3. The power storage device according to claim 2,
    wherein the charge control unit calculates a charging power necessary for making up the difference.

4. The power storage device according to claim 1, further comprising
    a memory unit that stores a user's schedule information,
    wherein the charging period calculation unit calculates the charging period information on the basis of the user's schedule stored in the memory unit.

5. The power storage device according to claim 1, further comprising:
    a memory unit that stores a usage history of the power storage device; and
    a prediction unit that predicts a usage start time when a user starts using the power storage device on the basis of the usage history stored by the memory unit,
    wherein the charging period calculation unit calculates the charging period information on the basis of the usage start time predicted by the prediction unit.

6. The power storage device according to claim 1,
    wherein the charging period calculation unit acquires charging period information input by a user.

7. The power storage device according to claim 1,
    wherein the charge control unit selects a charging method on the basis of the charging period information and the charging power.

8. The power storage device according to claim 1,
    wherein the charge control unit determines whether the charging power is to be recalculated at a predetermined interval.

9. A power storage method comprising:
    acquiring charging period information for charging a secondary battery using a charging period calculation unit within a power storage device, the charging period calculation unit receiving the charging period information that is calculated by a charging period control device on the basis of a user's schedule information through wireless communication;
    calculating a charging power on the basis of the charging period information using a charge control unit within the power storage device;
    controlling charging power used for charging the secondary battery so that the charging power is equal to the calculated charging power using the charge control unit; and
    determining whether the charging power is to be recalculated.

10. The power storage method according to claim 9, further comprising:
    if the charging power is to be recalculated,
        acquiring second charging period information for charging the secondary battery using the charging period calculation unit within the power storage device;
        calculating a second charging power on the basis of the charging period information using the charge control unit within the power storage device;
        controlling charging power used for charging the secondary battery so that the charging power is equal to the second calculated charging power using the charge control unit; and
        determining whether the second charging power is to be recalculated.

11. The power storage method according to claim 9, further comprising:
    if the charging power is not to be recalculated,
        determining whether charging the secondary battery is completed.

12. A program that causes a computer to execute the processes of:
    acquiring charging period information for charging a secondary battery using a charging period calculation unit within a power storage device, the charging period calculation unit receiving the charging period information that is calculated by a charging period control device on the basis of a user's schedule information through wireless communication;
    calculating a charging power on the basis of the charging period information using a charge control unit within the power storage device;
    controlling charging power used for charging the secondary battery so that the charging power is equal to the calculated charging power using the charge control unit; and
    determining whether the charging power is to be recalculated.

* * * * *